(12) United States Patent
Poster

(10) Patent No.: US 11,168,726 B2
(45) Date of Patent: Nov. 9, 2021

(54) REDUCED SHANK FASTENERS

(71) Applicant: Bell Helicopter Textron Inc., Forth Worth, TX (US)

(72) Inventor: Scott David Poster, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 59 days.

(21) Appl. No.: 15/967,913

(22) Filed: May 1, 2018

(65) Prior Publication Data
US 2019/0338802 A1    Nov. 7, 2019

(51) Int. Cl.
| F16B 33/02 | (2006.01) |
| F16B 31/04 | (2006.01) |
| B64C 27/14 | (2006.01) |
| F16B 33/04 | (2006.01) |
| F16H 57/02 | (2012.01) |

(52) U.S. Cl.
CPC .............. *F16B 33/02* (2013.01); *F16B 31/04* (2013.01); *B64C 27/14* (2013.01); *F16B 2033/04* (2013.01); *F16H 57/02* (2013.01)

(58) Field of Classification Search
CPC ...... F16B 33/02; F16B 31/04; F16B 2033/04; B64C 27/14; F16H 57/02
See application file for complete search history.

(56) References Cited

U.S. PATENT DOCUMENTS

| 3,933,332 | A | * | 1/1976 | Lovisa | ................ | E04G 17/0652 |
| | | | | | | 249/42 |
| 4,249,759 | A | * | 2/1981 | Heckethorn | ........ | F01N 13/1805 |
| | | | | | | 24/277 |
| 5,193,956 | A | | 3/1993 | Duran | | |
| 6,073,552 | A | * | 6/2000 | Cruse | .................... | F16B 1/0071 |
| | | | | | | 101/32 |
| 9,062,701 | B2 | | 6/2015 | Hyatt | | |
| 9,212,679 | B2 | | 12/2015 | Gmirya et al. | | |
| 2003/0071189 | A1 | * | 4/2003 | Petkau | ................ | E04G 17/0657 |
| | | | | | | 249/190 |
| 2011/0142657 | A1 | | 6/2011 | Jacobsen | | |

FOREIGN PATENT DOCUMENTS

EP    3034862 A1    6/2016

OTHER PUBLICATIONS

Sonderschrauben Guldnerm "Maßtabelle—DIN 2510 Form L (Standardorm)" Oct. 23, 2014, pp. 1-1, XP055194036, URL:http://gueldner.agenturkundenserver.de/upload/images/DIN2510/Datenblatter/Datenblatt_DIN_2510_Form_L.pdf.
Bell Helicopter, Flight International "Bell 525 Relentless" Nov. 12, 2014.

(Continued)

*Primary Examiner* — Rick K Chang
(74) *Attorney, Agent, or Firm* — Edwin S. Flores; Daniel J. Chalker; Chalker Flores, LLP

(57) ABSTRACT

A fastener includes: a shaft having longitudinal axis and a first and second threaded portions, the first and second threaded portions separated by a central portion having a reduced diameter between the first and second threaded portions, and at least one of the first or second threaded portions is chamfered to reduce friction on leading threads.

10 Claims, 5 Drawing Sheets

(56) References Cited

OTHER PUBLICATIONS

Perry, Dominic "ANALYSIS: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pp.
European Patent Office, European Search Report for EP Appl. No. 18181813.9 dated Jan. 2, 2019, 8 pp.

* cited by examiner

REDUCED SHANK FASTENERS

CROSS-REFERENCE TO RELATED APPLICATIONS

This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which is hereby incorporated by reference in its entirety.

STATEMENT OF FEDERALLY FUNDED RESEARCH

Not applicable.

TECHNICAL FIELD OF THE INVENTION

The present invention relates in general to the field of fasteners, and more particularly, to reduced shank (wasp waist) fasteners for clearance to surrounding material and imperfect threads.

BACKGROUND OF THE INVENTION

Without limiting the scope of the invention, its background is described in connection with fasteners.

One example is U.S. Pat. No. 9,062,701, issued to Hyatt, entitled "Pitch diameter shank bolt with shear sleeve", which is a fastener that includes a fastening portion including a head, a threaded portion having a first diameter, and a shank having a second diameter that is less than the first diameter. The shank is located between the head and the threaded portion. A sleeve surrounds the shank. The sleeve and the shank are uncoupled.

Another example is taught in U.S. Pat. No. 5,193,956, issued to Duran, entitled "Adjustable diameter bolt with adjustable nut", which is said to teach a self-retaining adjustable diameter bolt with an adjustable nut including a bolt having a head, a shank, and a threaded end adapted to be inserted into a hole in an installation for subsequent coupling to an nut assembly. The bolt is said to include a pawl with a plurality of bushing segments mounted on the bolt shank, the pawl extending through an opening in the bolt adapted to engage the segments to stop withdrawal from the bolt.

SUMMARY OF THE INVENTION

In one embodiment, the present invention includes a fastener including: a shaft having a longitudinal axis and a first and second threaded portions, the first and second threaded portions are separated by a central portion having a reduced diameter between the first and second threaded portions, and at least one of the first or second threaded portions is chamfered to reduce friction on leading threads. In one aspect, the chamfer of the first threaded portion, the second threaded portion, or both the first and second threaded portions, has between 35 and 55 degrees. In another aspect, the central portion has a reduced diameter equal to or smaller than a minor diameter of the first and second threaded portions. In another aspect, the shaft is high nickel chromium steel, chromium molybdenum steel, or high-carbon steel. In another aspect, the shaft is EN29, EN27, EN36 or EN39 steel. In another aspect, the first and second threaded portions have different diameters. In another aspect, the first and second threaded portions have different lengths. In another aspect, the reduced diameter of the central portion provides a clearance between a structure and the central portion. In another aspect, the fastener further includes an indicia stamped at a first face, a second face, or both the first and second face at the respective ends of the fastener. In another aspect, the fastener further includes a shaped portion within the central portion, wherein the shaped portion is adapted to tighten the fastener into a receiving thread. In another aspect, a material for the fastener is selected that has a tensile strength along the longitudinal axis that is greater than a sheer strength at the central portion. In another aspect, the reduced diameter of the central portion allows the fastener to be installed deeper into a structure.

In another embodiment, the present invention includes a method of providing clearance and maximizing a tensile strength between a first, a second and a third component, including: selecting a fastener including a shaft having longitudinal axis and a first and second threaded portions, the first and second threaded portions separated by a central portion having a reduced diameter between the first and second threaded portions, and at least one of the first or second threaded portions is chamfered to reduce friction on leading threads; and fastening the first, second and third components with the fastener, wherein the first and third components are fastened with the first and second threaded portions, or one or more nuts attached thereto, and the second component is positioned around the central portion, wherein the fastener provides a clearance between the second component and the central portion of the fastener, and the fastener maximizes the tensile strength along the longitudinal axis of the fastener when fastened. In one aspect, the chamfer of the first threaded portion, the second threaded portion, or both the first and second threaded portions, has between 35 and 55 degrees. In another aspect, the central portion has a reduced diameter equal to or smaller than the minor diameter of threads of the first and second threaded portions. In another aspect, the shaft is high nickel chromium steel. In another aspect, the shaft is chromium molybdenum steel or high-carbon steel. In another aspect, the shaft is EN29, EN27, EN36 or EN39 steel. In another aspect, the first and second threaded portions have different diameters. In another aspect, the first and second threaded portions have different lengths. In another aspect, the reduced diameter of the central portion provides a clearance between a structure and the central portion. In another aspect, the method further includes stamping an indicia at a first face, a second face, or both the first and second face at the respective ends of the fastener. In another aspect, the method further includes selecting a material for the fastener that has the tensile strength along the longitudinal axis that is greater than a sheer strength at the central portion. In another aspect, the reduced diameter of the central portion allows the fastener to be installed deeper into a structure.

In another embodiment, the present invention includes a fastener for fastening components of a rotorcraft including: a shaft having longitudinal axis and a first and second threaded portions, the first and second threaded portions separated by a central portion having a reduced diameter between the first and second threaded portions, wherein a material for the fastener is selected that maximizes tensile strength along the longitudinal axis, and at least one of the first or second threaded portions is chamfered to reduce friction on leading threads, wherein the fastener affixes to and first and a third component of the rotorcraft at the first and second threaded portions, but has a clearance of a second component positioned and retained by the first and third components, wherein a clearance is found between the central portion and the second component. In one aspect, the first, second, and third components form a housing for a gearbox.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
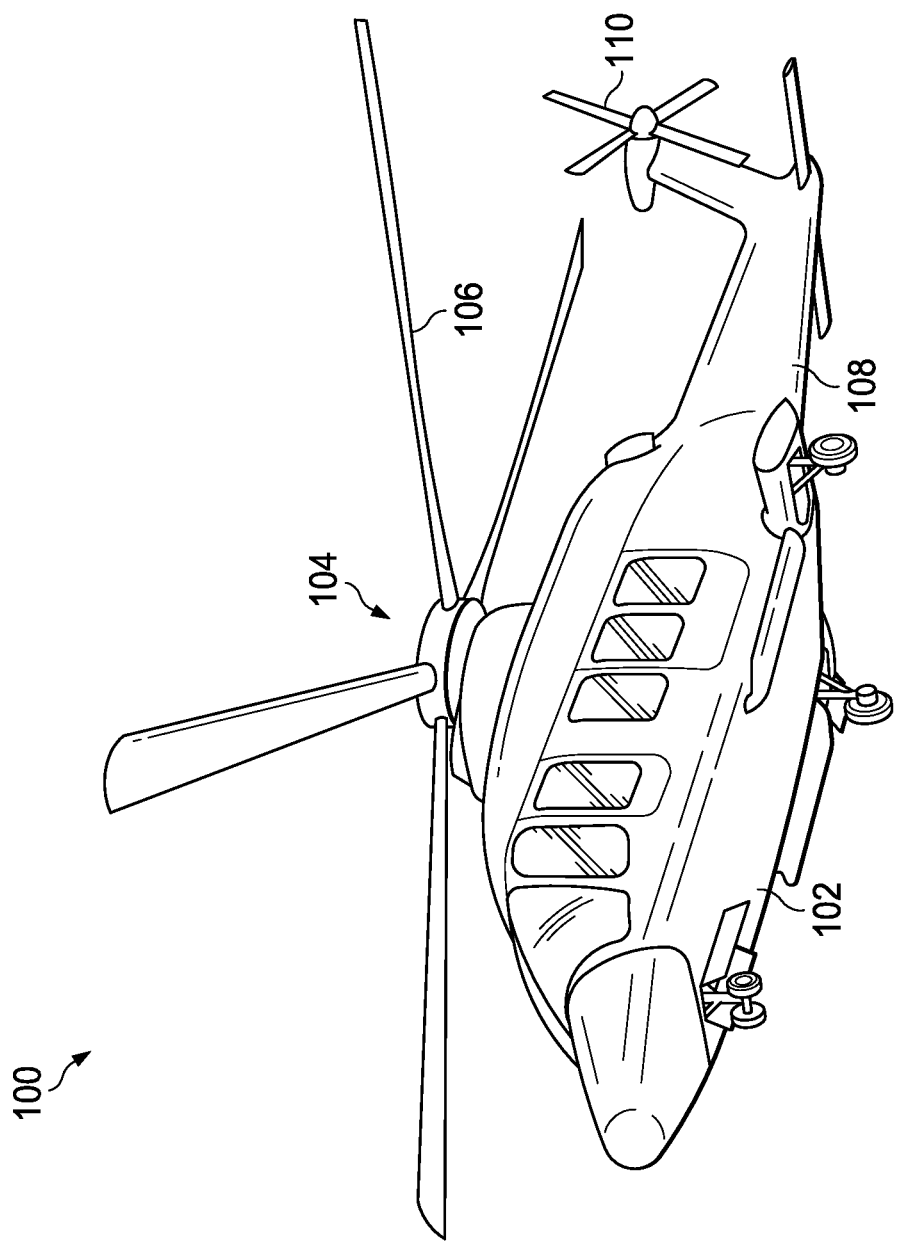
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
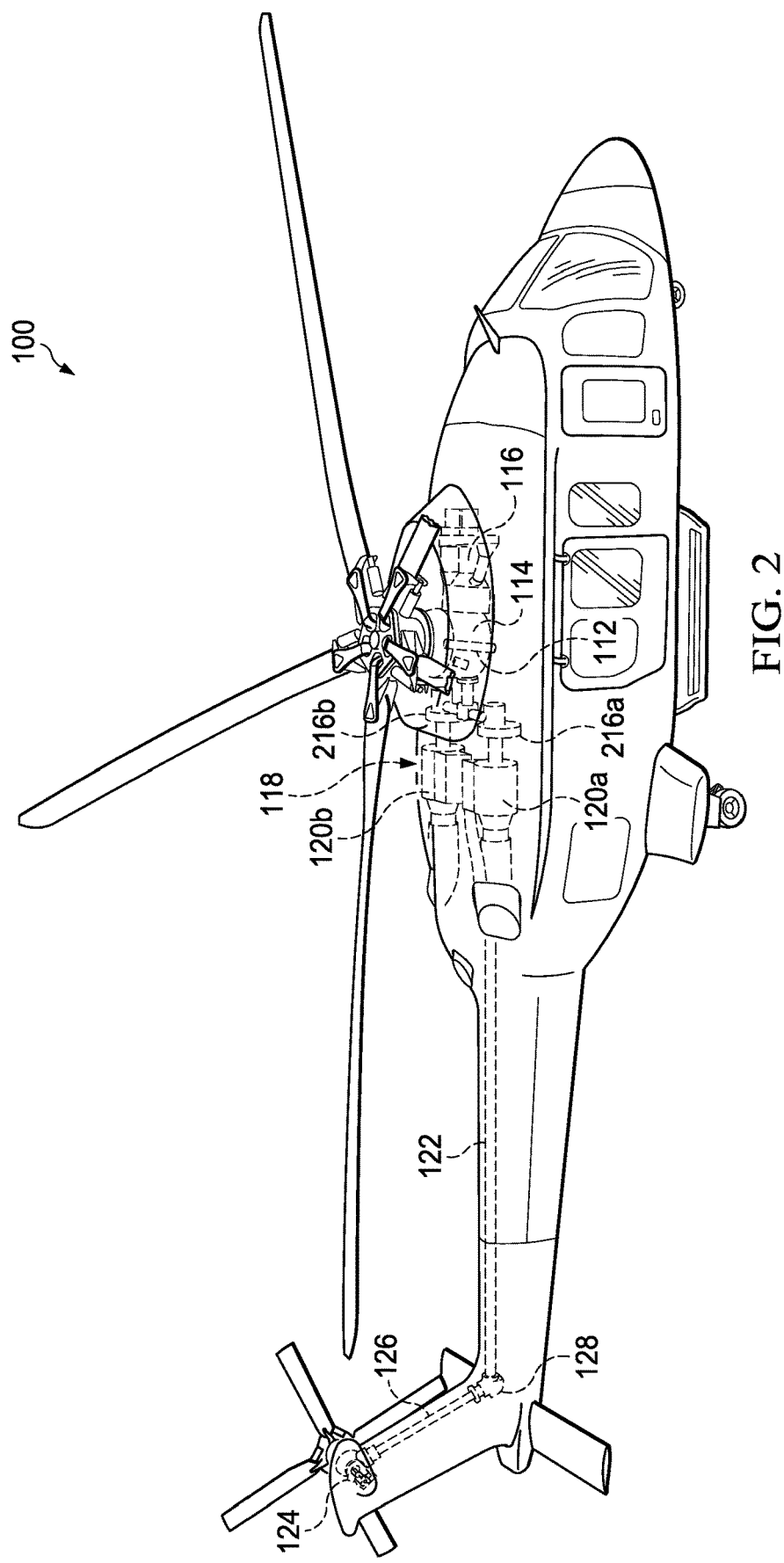
FIG. 2 shows a partial cross-section, perspective view of helicopter aircraft according to an alternative embodiment of the present application.

For example, FIG. 2 shows a partial cross-section perspective view of aircraft 100 that includes additional detail of the present invention. Aircraft 100 further includes a rotor mast 112, which is connected to the main rotor gearbox (MRGB) 114. The MRGB 114 is connected to one or more accessory gear boxes 116 and one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

The drive system and subcomponents of aircraft 100 were developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

The drive system and subcomponents of aircraft 100 overcome many drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

High-speed gearing and the associated heat generation is always an area of concern for gearbox survivability. The ability to continue torque transmission, particularly in a loss of lubrication scenario, is of great importance. For this reason, the drive system described herein includes two separate RGB's, each one connected to a separate engine and independent from the MRGB. The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM prior to transmitting torque to the MRGB. With this drive system arrangement high-speed gearing is contained in separate gearboxes, as such, the survivability of the total drive system is greatly enhanced, particularly in the event of high-speed gear failure or loss of lubricant in an individual RGB.

The drive system of aircraft 100 can also take advantage of a number of additional features that minimize the possibility of loss of lubricant, to maximize the operational time if a loss of lubricant event does occur. The drive system can also include one or more of the following: (1) the use of transfer tubes for cooler and filter mounting to eliminate the loss of lubricant in the event of loss of attachment fastener torque; (2) using an oil cooler mounted directly to the main rotor gearbox eliminating external hoses; (3) all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation during a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

Figure 3:
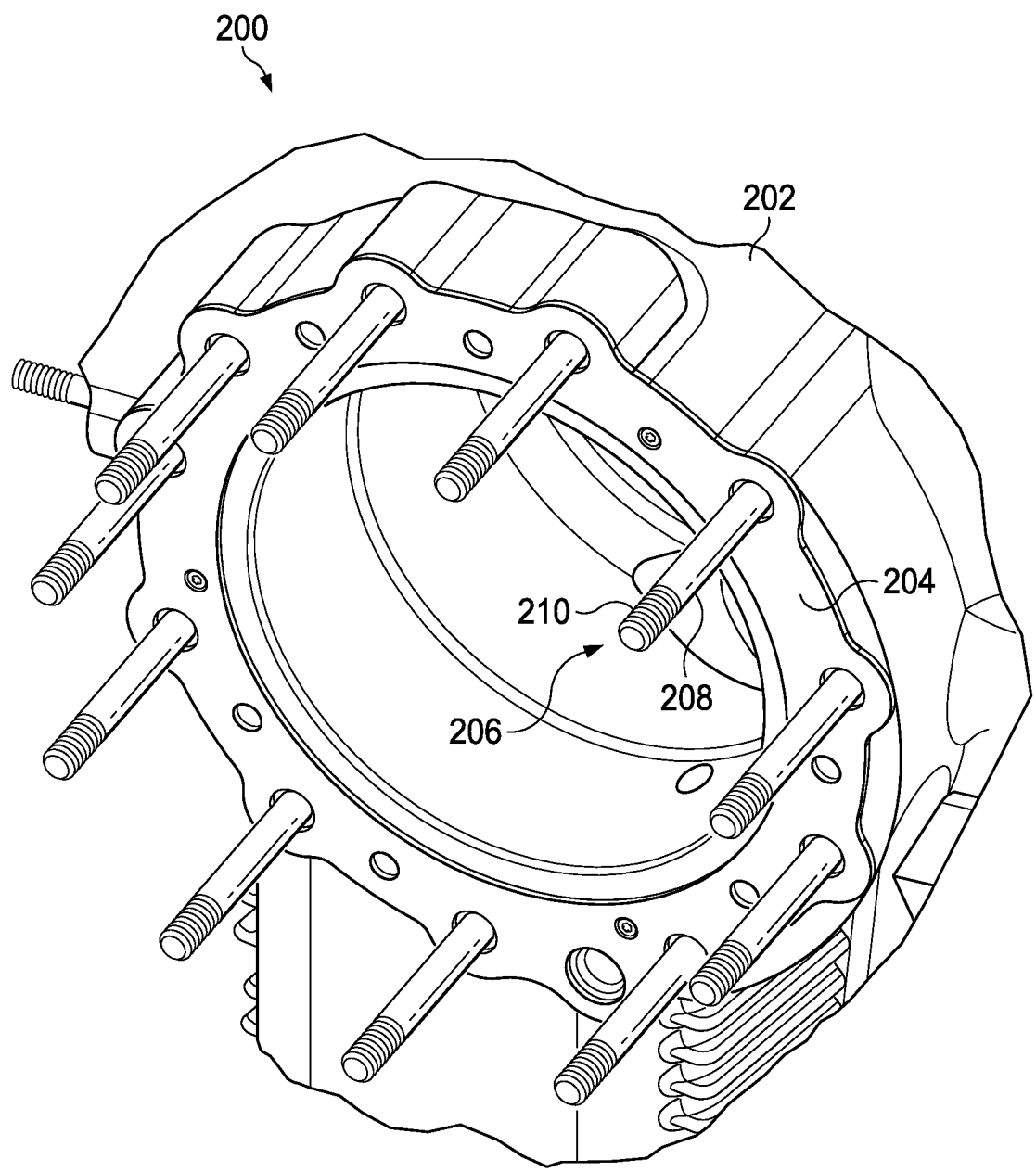
FIG. 3 shows an isometric view of a component of an aircraft, such as a gearbox, that includes a typical fastener of the prior art.

FIG. 3 shows an isometric view of a component 200 of an aircraft, such as a gearbox, that includes a housing 202 shown herein with a shim 204. A fastener 206 typical in the art is shown in which the central portion 208, and the threaded portion 210 have the same overall cross-sectional diameter. Typically, this type of fastener 206 can be used to attach another part of the housing (not depicted), which must fit around each of the fasteners 206, however, this type of traditional fastener requires that both the fasteners 206 and the additional housing be made with a very high tolerance such that the additional housing and the fasteners 206 fit tightly.

Figure 4:
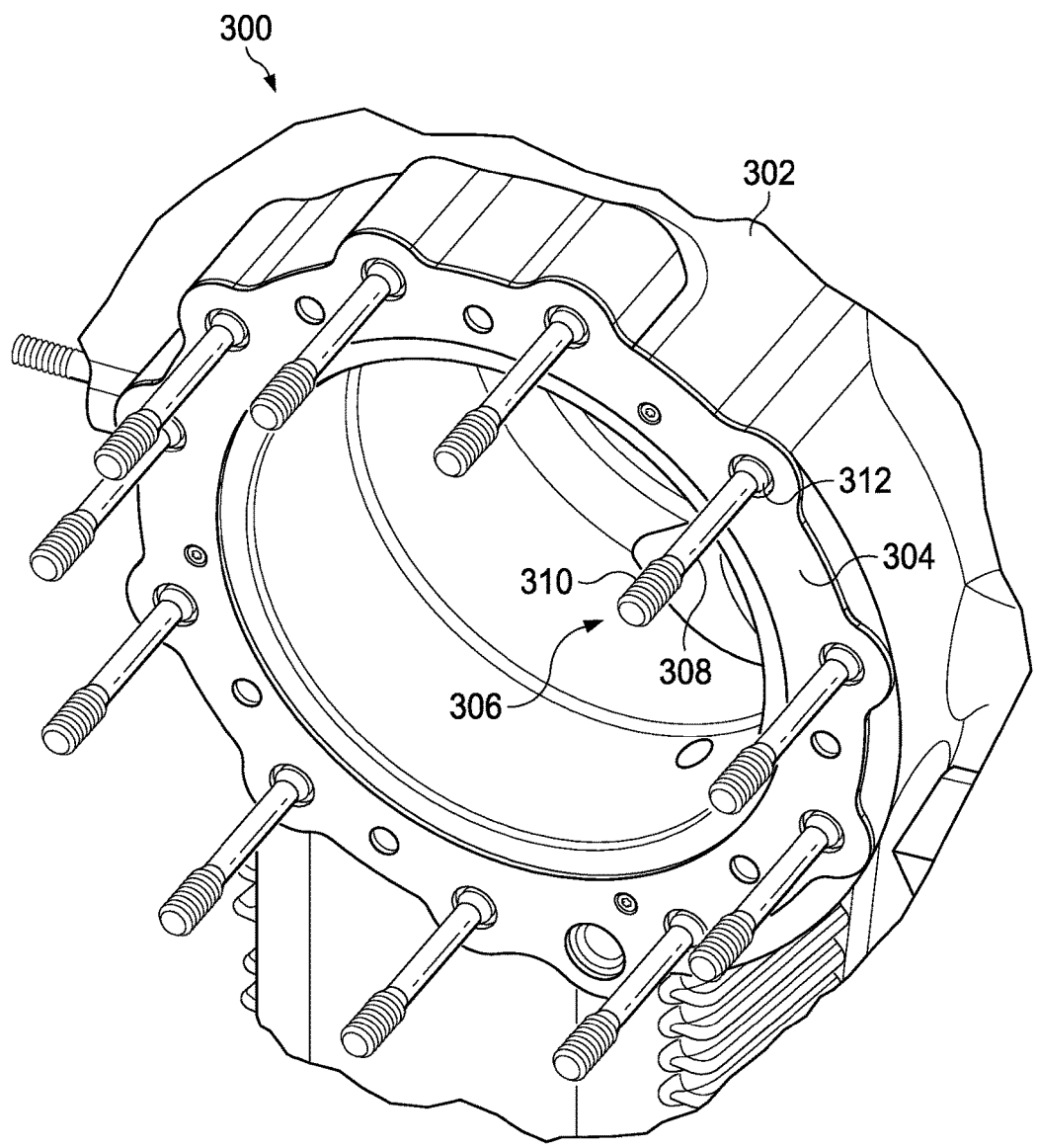
FIG. 4 is an isometric of a component of an aircraft, such as a gearbox, that is shown using with the fastener or fastener of the present invention.
Figure 5:
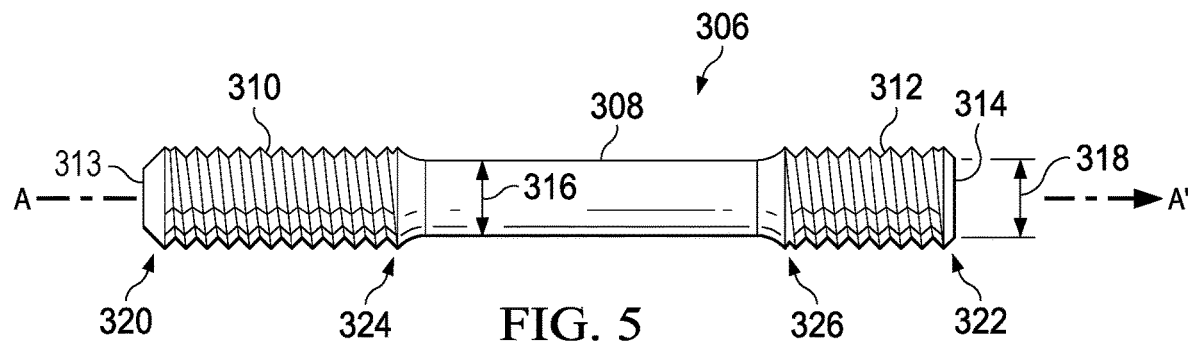
FIG. 5 shows a side view of the fastener of the present invention, shown with a longitudinal axis A-A', the central portion having a reduced diameter, and the first and second threaded portions.

FIG. 4 is an isometric of a component 300 of an aircraft, e.g., aircraft 100, such as a gearbox, e.g., main rotor gearbox 114, that includes a housing 302 shown herein with a shim 304. As also shown in FIG. 5, the fastener 306 of the present invention has a longitudinal axis A-A' in which the central portion 308 has a reduced diameter 316 (or wasp-waist) when compared to first and second threaded portions 310 and 312 or to a structure such as component 300 with which fastener 306 may be used. The threaded portions 310 and 312 may have the same overall cross-sectional diameter, while the central portion 308 does not. Moreover, the threaded portions 310 and 312 have leading threads 320 and 322, and imperfect threads 324 and 326, respectively. At least one of the first or second threaded portions 310 and 312 is chamfered to reduce friction on leading threads 320 and/or 322. The first or second threaded portions 310 or 312, or both, may have a chamfer of between 35 and 55 degrees. The fastener 306 is used to attach another part of the housing (not depicted), which must fit around each of the fastener 306, however, as a result of the reduced diameter of the central portion 308 of the fastener 306 there is a reduced need for the additional housing, the fastener 306, or both, to have the same high degree of tolerance as in the current art. Further, the design of the fastener 306 of the present invention solves the problem with the fastener "shanking" on imperfect threads, which is often an issue when installing the fastener in a housing The shank of a conventional, prior art fastener is larger than the minor diameter of the threads of the fastener, which limits the depth of the installed fastener. In contrast, the central portion 308 of fastener 306 of the present invention has a reduced diameter 316 that is smaller than or equal to the minor diameter 318 of the threaded portions 310 and 312. As a result, "shanking" does not occur, and the fastener 306 may be installed deeper into a structure than conventional, prior art fasteners. The reduced diameter 316 of central portion 308 also helps prevent the fastener 306 from experiencing bending or shear loading, substantially limiting the force on the fastener 306 to tensile loading. The reduced diameter of the central portion 308 may provide a clearance between a structure and the central portion 308. There may also be a shaped portion within central portion 308 that is adapted to tighten fastener 306 into a receiving thread (not shown). The fastener 306 may be used in conjunction with nuts (not shown). The fastener may be used to fasten components of any vehicle such as aircraft 100.

In a typical installation the fastener 306 will be made from steel, steel alloys, or other metals, that have a high tensile strength along the longitudinal axis A-A' of the fastener 306. The tensile strength along the longitudinal axis A-A' of the fastener 306 may be higher than a sheer strength at the central portion 308. The reduced diameter between the first and second threaded portions is smaller than the minor diameter of the first and second threaded portions. A wide variety of steel or other alloys can be used to make the fastener 306 including, e.g., high-nickel chromium steel, chromium molybdenum steel, high-carbon steel, EN29, EN27, EN36 or EN39 steel, and/or combinations thereof. In some embodiments, the fastener may have threaded portions 310, 312 of the same of different lengths, or even different diameters. An example of high-nickel chromium steel is 18/10 stainless steel, which has 18% chromium or chrome and 10% nickel. The fastener 306 may also have one or more indicia on faces at ends 313, 314 of the fastener that help the user know the different variables for, e.g., the overall length, diameter, type of threading, direction of threading (right or left handed), pitch, one or two start, coarse, fine, depth, taper, which can be metric or Unified Thread Standard, National pipe thread, British standard, Unified inch screws threads, ISO, BSP, etc.

Figure 6:
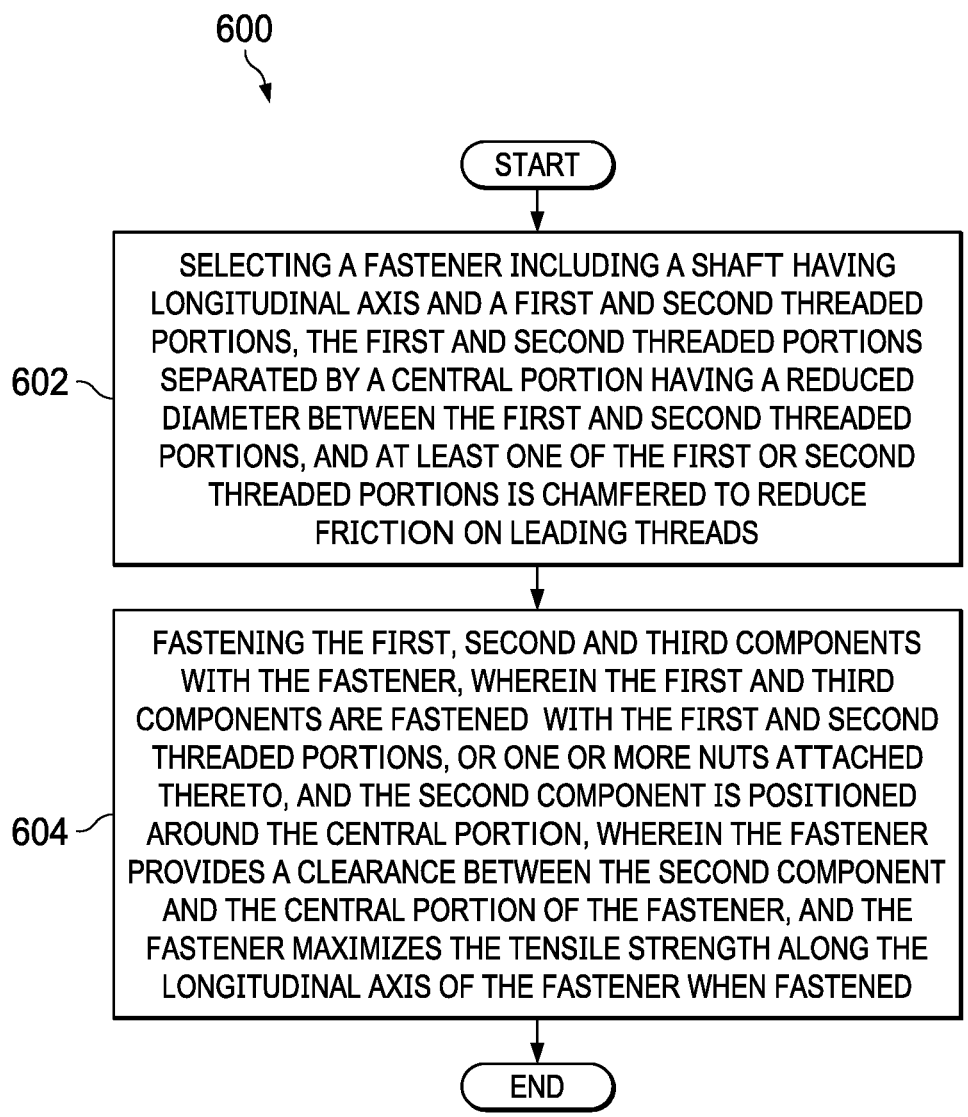
FIG. 6 shows a flowchart of a method in accordance with another embodiment of the present invention.

FIG. 6 shows a flowchart of a method 600 in accordance with another embodiment of the present invention that provides clearance and maximizes a tensile strength between a first, a second, and a third component. A fastener is selected in block 602 in which the fastener includes a shaft having longitudinal axis and a first and second threaded portions, the first and second threaded portions separated by a central portion having a reduced diameter between the first and second threaded portions, and at least one of the first or second threaded portions is chamfered to reduce friction on leading threads in block 602. The first, second and third components are fastened together with the fastener in block 604, wherein the first and third components are fastened with the first and second threaded portions, or one or more nuts attached thereto, and the second component is positioned around the central portion, wherein the fastener provides a clearance between the second component and the central portion of the fastener, and the fastener maximizes the tensile strength along the longitudinal axis of the fastener when fastened.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A gearbox housing in combination with a gearbox housing fastener comprising:
    a gearbox housing fastener comprising:
        a single straight shaft having a longitudinal axis, a first threaded portion, a single cylindrical central portion, and a second threaded portion, wherein the first and second threaded portions are separated by the single cylindrical central portion, wherein:
            the single cylindrical central portion comprises a single reduced diameter that is less than a first minor diameter of the first threaded portion and a second minor diameter of the second threaded portion;
            the first and second threaded portions are chamfered to reduce friction on leading threads; and
            the gearbox housing fastener comprises a material that has a tensile strength along the longitudinal axis that is greater than a sheer strength at the single cylindrical central portion; and
    first, second, and third gearbox housing components fastened together with the gearbox housing fastener, wherein:
        the first and third gearbox housing components are fastened with the first and second threaded portions, or one or more nuts attached thereto; and
        the second gearbox housing component is positioned around the single cylindrical central portion, wherein the gearbox housing fastener provides a clearance between the second gearbox housing component and the single cylindrical central portion of the gearbox housing fastener.

2. The gearbox housing in combination with the gearbox housing fastener of claim 1, wherein the chamfer of the first threaded portion, the second threaded portion, or both the first and second threaded portions, has between 35 and 55 degrees.

3. The gearbox housing in combination with the gearbox housing fastener of claim 1, wherein the straight shaft is high nickel chromium steel, chromium molybdenum steel, or high-carbon steel.

4. The gearbox housing in combination with the gearbox housing fastener of claim 1, wherein the straight shaft is EN29, EN27, EN36 or EN39 steel.

5. The gearbox housing in combination with the gearbox housing fastener of claim 1, wherein the first and second threaded portions have different diameters.

6. The gearbox housing in combination with the gearbox housing fastener of claim 1, wherein the first and second threaded portions have different lengths.

7. The gearbox housing in combination with the gearbox housing fastener of claim 1, further comprising an indicia stamped at a first face, a second face, or both the first and second face at respective ends of the fastener.

8. The gearbox housing in combination with the gearbox housing fastener of claim 1, wherein the single reduced diameter of the single cylindrical central portion allows the fastener to be installed deeper into a structure.

9. The gearbox housing in combination with the gearbox housing fastener of claim 1, wherein the gearbox housing is a rotorcraft gearbox housing.

10. The gearbox housing in combination with the gearbox housing fastener of claim 1, wherein the second gearbox housing component is a shim.

\* \* \* \* \*